(12) United States Patent
Buehler et al.

(10) Patent No.: US 9,322,651 B2
(45) Date of Patent: Apr. 26, 2016

(54) SYSTEM AND METHOD FOR UTILIZING MULTIPLE SENSORS

(75) Inventors: Eric Daniel Buehler, Grand Rapids, MI (US); David Kevin McCauley, Caledonia, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 159 days.

(21) Appl. No.: 13/598,115

(22) Filed: Aug. 29, 2012

(65) Prior Publication Data

US 2014/0067165 A1 Mar. 6, 2014

(51) Int. Cl.
| | |
|---|---|
| *G01S 17/88* | (2006.01) |
| *G01S 5/16* | (2006.01) |
| *G01S 1/70* | (2006.01) |
| *H04N 9/74* | (2006.01) |
| *G01C 11/02* | (2006.01) |
| *G01S 17/89* | (2006.01) |
| *G01S 5/02* | (2010.01) |
| *B64D 39/00* | (2006.01) |

(52) U.S. Cl.
CPC ............. *G01C 11/02* (2013.01); *G01S 5/0226* (2013.01); *G01S 5/16* (2013.01); *G01S 17/88* (2013.01); *G01S 17/89* (2013.01); *B64D 39/00* (2013.01)

(58) Field of Classification Search
CPC ......... G01S 17/88; G01S 5/16; G01S 5/0226; G01S 1/70; G01S 17/74; G01C 21/24; G05D 1/104; G05D 1/0225; G05D 1/0676; G05D 2201/0216; G06F 17/00; G06K 9/36; G06K 9/40; G09G 5/00; B64D 39/00; B64G 1/646; H04B 10/00; H04N 9/74
USPC ............ 701/4, 300; 356/601, 614; 244/135 A
See application file for complete search history.

(56) References Cited

U.S. PATENT DOCUMENTS

| | | | |
|---|---|---|---|
| 4,189,703 A | 2/1980 | Bennett | |
| 4,709,875 A | 12/1987 | Cremosnik et al. | |
| 7,681,839 B2 * | 3/2010 | Mickley et al. | ........... 244/135 A |
| 8,386,096 B2 * | 2/2013 | Stimac et al. | ..................... 701/4 |
| 8,872,081 B2 | 10/2014 | Feldmann et al. | |
| 2011/0153205 A1 | 6/2011 | Stimac et al. | |
| 2012/0001017 A1 | 1/2012 | Strachan et al. | |

FOREIGN PATENT DOCUMENTS

EP 2339296 A2 6/2011

OTHER PUBLICATIONS

European Search Report and Opinion issued in connection with corresponding EP Application No. 13182226.4 on Oct. 20, 2014.

* cited by examiner

*Primary Examiner* — John Q Nguyen
*Assistant Examiner* — Aaron Smith
(74) *Attorney, Agent, or Firm* — GE Global Patent Operation; William S. Munnerlyn

(57) ABSTRACT

A sensor system having multiple sensors and having a grid generator projecting into space a relative navigation grid and a method of utilizing multiple airborne sensors operably coupled to an aircraft and coordinating the sensor outputs from the airborne sensors based on the determined spatial position of the multiple sensors and a method for utilizing multiple airborne sensors.

13 Claims, 3 Drawing Sheets

SYSTEM AND METHOD FOR UTILIZING MULTIPLE SENSORS

BACKGROUND OF THE INVENTION

Airborne sensor systems may be used to obtain data and information, such as three dimensional images and topography. Such systems may collect time-synchronous data or images and the individual data elements, such as images, may then be pieced together and coupled to a position and orientation system to transform 2-D data to 3-D data and/or improve the quality of the 3-D date. Contemporary airborne sensor systems are limited in three-dimensional feature extraction due to the proximity of the camera systems as the current camera systems require a great reduction in imaging noise to be able to extract dimensional artifacts from the image set. Separation of the camera systems provides for a reduction in image quality while maintaining the capability of the system. The precision of information available from these systems is significantly less than desired.

BRIEF DESCRIPTION OF THE INVENTION

In one embodiment, the invention relates to a sensor system having multiple sensors and having a grid generator projecting into space a relative navigation grid, multiple sensors located within the relative navigation grid and providing sensor outputs, a position detector configured to detect the position of each of the multiple sensors relative to the navigation grid and providing a corresponding position outputs, and a coordination engine coordinating the sensor outputs based on the position outputs and generating a coordinated sensor output.

In another embodiment, the invention relates to a method of utilizing multiple airborne sensors operably coupled to an aircraft and providing a sensor output including projecting a relative navigation grid from one of the aircraft and airborne sensors and determining a spatial position of the multiple sensors within the relative navigation grid, and coordinating the sensor outputs from the airborne sensors based on the determined spatial position of the multiple sensors.

DESCRIPTION OF EMBODIMENTS OF THE INVENTION

Figure 1:
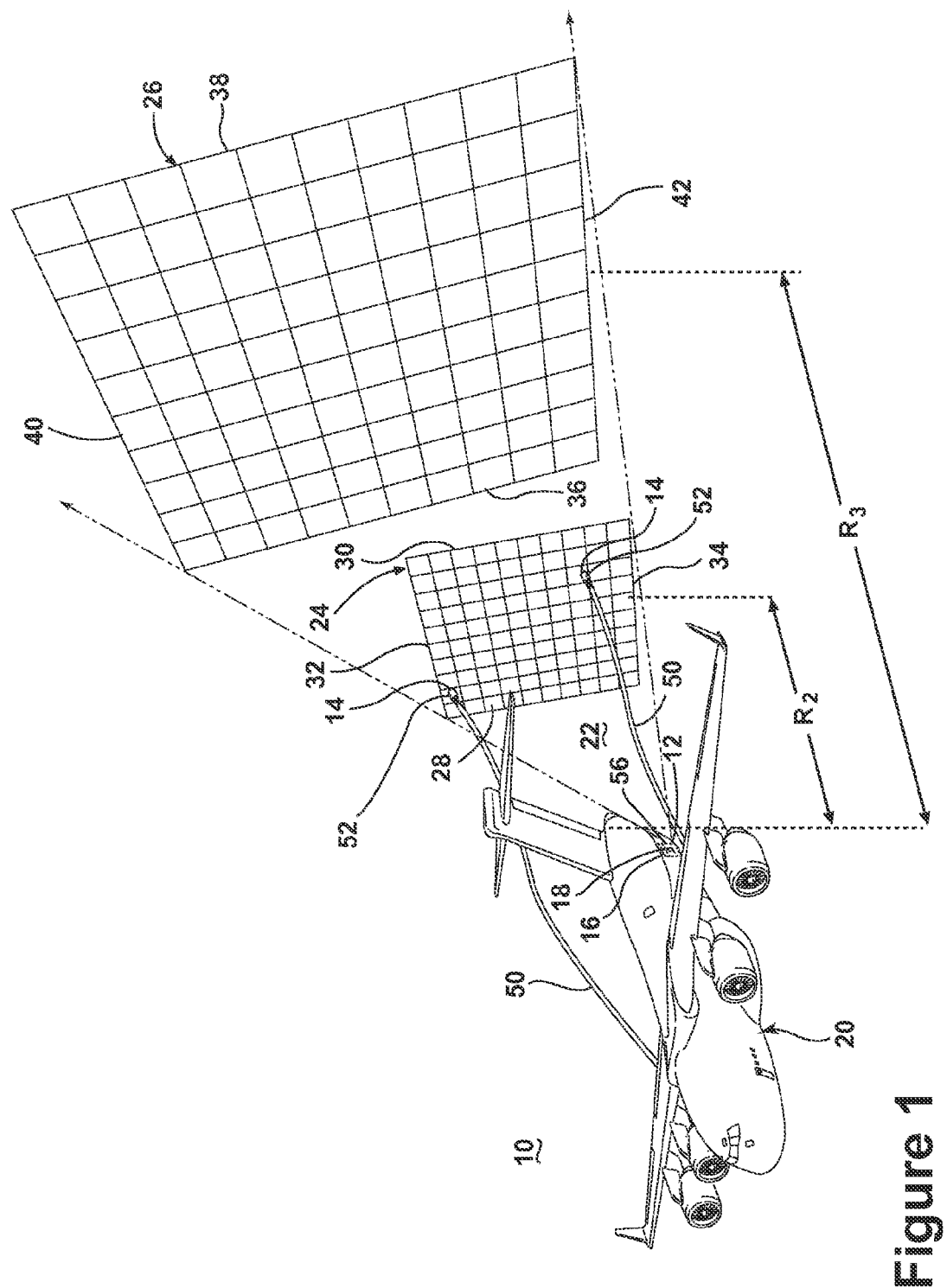
FIG. 1 is a perspective view of a sensor system according to a first embodiment of the invention.

The embodiments of the present invention are related to a sensor system and methods of utilizing multiple airborne sensors. FIG. 1 illustrates an embodiment of the sensor system 10, which has been illustrated as including a grid generator 12, multiple sensors 14, a position detector 16, and a coordination engine 18 operably coupled with an aircraft 20. More specifically, the aircraft 20 may be equipped with a grid generator 12, which may project a relative navigation grid, such as a plurality of intersecting lines, into space within a field of transmission 22. The general details of how to project the relative navigation grid are known in the art, which include the disclosure in U.S. Pat. No. 7,681,839, issued Mar. 23, 2010, entitled Optical Tracking System For Refueling, and US 2011/0153205, published Jun. 23, 2011, entitled Relative Navigation System, both of which are incorporated by reference. Therefore, the specific details of the grid generation will not be fully described in this application, only a general description sufficient for describing the embodiments of the invention will be provided.

As illustrated, the projected relative navigation grid comprises intersecting lines. At some distance away from the grid generator 12, these intersecting lines are observed as a grid in space, with the size of the relative navigation grid increasing away from the grid generator 12. For description purposes, the grid generator 12 may be thought of as projecting intersecting lines substantially in the y direction of the coordinate system. If one were to observe the projection of intersecting lines in the x-z plane at some distance $R_2$ away from the grid generator 12, one would observe a first relative navigation grid 24. If one were to observe the same projection of intersecting lines at a distance $R_3$, which is greater than the first distance $R_2$ in the x-z plane, one would observe a second relative navigation grid 26, which appears relatively larger than the first relative navigation grid 24.

The first relative navigation grid 24 at distance $R_2$ away from the grid generator 12 is spatially bound in the horizontal direction by a first vertical line 28 and a second vertical line 30. There exists a plurality of vertical lines spatially and temporally generated in between the first vertical line 28 and the second vertical line 30. The first relative navigation grid 24 at a distance $R_2$ away from the grid generator 12 is spatially bound in the vertical direction by a first horizontal line 32 and a second horizontal line 34. There exists a plurality of horizontal lines spatially and temporally generated in between the first horizontal line 32 and the second horizontal line 34. The distance $R_2$ can be any distance between the relative navigation grid 24 and the grid generator 12.

The second relative navigation grid 26 at distance $R_3$ away from the grid generator 12 is for all practical purposes the same as the first relative navigation grid 24, but at further distance from the grid generator 12 than the first relative navigation grid 24. The relative navigation grid 26 is spatially bound in the horizontal direction by a first vertical line 36 of the second relative navigation grid 26 and a second vertical line 38 of the second relative navigation grid 26. There exists a plurality of vertical lines spatially and temporally generated in between the first vertical line 36 of the second relative navigation grid 26 and the second vertical line 38 of the second relative navigation grid 26. The second relative navigation grid 26 at a distance $R_3$ away from the grid generator 12 is spatially bound in the vertical direction by a first horizontal line 40 of the second relative navigation grid 26 and a second horizontal line 42 of the second relative navigation grid 26. There exists a plurality of horizontal lines spatially and temporally generated in between the first horizontal line 40 of the second relative navigation grid and the second horizontal line 42 of the second relative navigation grid.

The similarity of the relative navigation grids 24 and 26 becomes apparent in the case of projected grid lines, where the relative navigation grid 26 is formed by the same lines forming the relative navigation grid 24, except that the relative navigation grid 26 is observed at a further distance from grid generator 12, making the relative navigation grid 26 appear larger than the relative navigation grid 24. In this sense, the relative navigation grid 26 is the appearance of the grid lines generated by the grid generator 12 at the distance $R_3$ whereas the relative navigation grid 24 is the appearance of the grid lines at the distance $R_2$.

The relative navigation grids 24 and 26 may be of any number of lines. As illustrated, they are comprised of ten vertical lines by ten horizontal lines. A relative navigation grid comprised of a greater number of intersecting lines may result in improved detection for a fixed field of transmission 22 and distance from the position detector 16 than a relative navigation grid comprised of a fewer number of intersecting lines. The relative navigation grids 24 and 26 are depicted as square-shaped, but this is not a requirement. The relative navigation grid can be any shape including rectangular, oval, or circular. Furthermore, the intersecting lines of the relative navigation grids 24 and 26 are depicted as orthogonal; however, this is not a requirement. The angles between the intersecting lines may be right angles, acute angles, or obtuse angles in different parts of the relative navigation grid.

The vertical and horizontal lines may be formed in any suitable manner by the grid generator 12. For example, all of the lines may be formed sequentially or all at once. Either one of the vertical lines or horizontal lines may be formed before the other. The grid generator 12 may alternate between vertical and horizontal lines. When the grid generator 12 uses a scanning laser to form the relative navigation grid, the laser will sequentially form all of one of the vertical and horizontal lines, followed by the sequential forming of the other of the vertical and horizontal lines. The rate at which the lines are sequentially formed may be so fast that for practical purposes, it is as if all of the grid lines were simultaneously formed. The radiation source for the plurality of projected lines may be a coherent or incoherent radiation source. For example, when the radiation source is a coherent source, it may be a solid state laser that emits radiation at a wavelength in the near-UV range. Additionally, the radiation frequency and/or intensity may be selected, or attenuated by use of an optical filter. The grid of intersecting projected lines may be generated by raster scanning each of the lines or by projecting and scanning an elongated radiation beam. Any suitable methods and apparatus for generating the intersecting lines may be used.

Although, examples shown use Cartesian coordinates, any appropriate coordinate system may be used including polar, cylindrical, or spherical coordinate systems for both grid generation and for grid detection. For example, to form a grid amenable to polar coordinate representation, a series of concentric circles and lines radiating out from the center of those circles may be projected by the grid generator into space.

Grid data may be encoded at one or more positions of the relative navigation grid. By grid data, it is meant that the structure or characteristic of the relative navigation grid provides data or information that may be read or detected by the position detector 16. In one embodiment, the projected lines comprising the series of projected intersecting lines are further encoded with different grid data in different regions of the relative navigation grid to indicate regions within the grid of intersecting lines. One manner of encoding of the grid data is by modulating the beam in the case of a laser being used to form the relative navigation grid. The modulation is achieved by changing the intensity of the beam and/or blocking the beam with some periodicity. Such a grid data may include a number and it is contemplated that each of the grid lines may include a number, which identifies the grid line to the position detector 16. For example, the relative navigation grid may be encoded with data that indicates the exact position within the relative navigation grid that defines the relative position of that point to the grid generator 12. Each scanning beam or portion of the relative navigation grid has a defined and fixed reference position to the grid generator 12.

It will be understood that the grid generator 12 may be capable of producing a relative navigation grid having a larger field of transmission than that illustrated. It is contemplated that the grid generator 12 may be configured to create a variety of shapes and sizes. For example, the grid generator 12 may be configured to generate a field of transmission such that the relative navigation grid may be emitted in particular sectors of a hemisphere. It is also contemplated that multiple grid generators that are configured to transmit relative navigation grids that collectively form a field of transmission may be used. The multiple grid generators may create opposing hemispheres or a sphere that essentially surrounds the aircraft. It is contemplated that for any of the above embodiments that the size and field of regard of the generated relative navigation grid may be tailored to any specific requirements of the sensor system 10 for any particular purpose.

Figure 2:
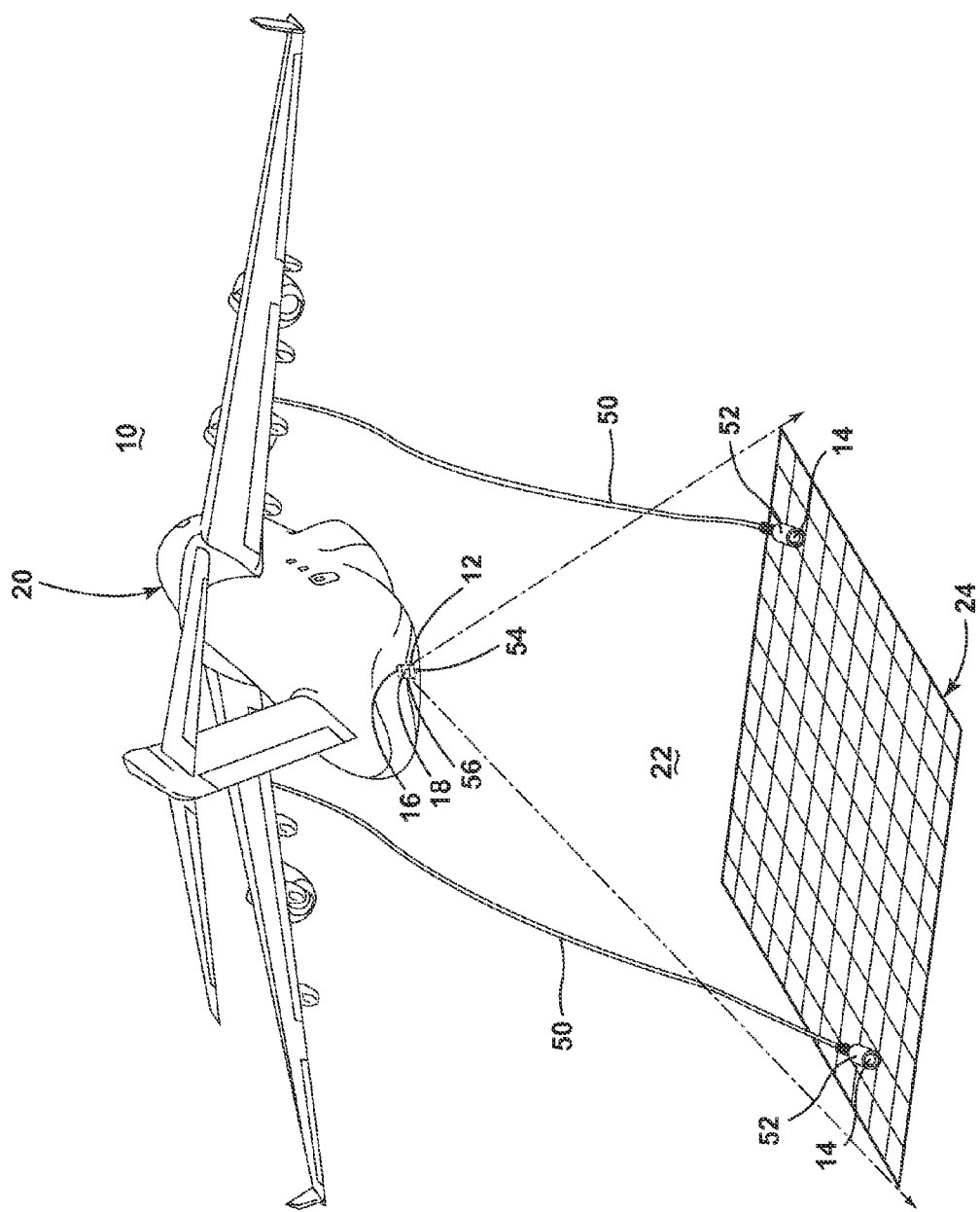
FIG. 2 is a second perspective view of the sensor system of FIG. 1.

The multiple sensors 14 may be located within the relative navigation grid 24 projected into space by the grid generator 12. While the multiple sensors 14 may be at varying distances away from the grid generator 12, for ease of explanation, the multiple sensors 14 will be described as being located within the relative navigation grid 24. The multiple sensors 14 may more clearly be seen in FIG. 2. The multiple sensors 14 may be any type of sensor used for evaluation of the environment around them. By way of non-limiting example, the multiple sensors may be at least one of an EO/IR, SWIR, MWIR, Multispectral, Hyperspectral, SAR, SIGINT, SONAR, and Radio type sensors. Depending on the type of sensors used for the multiple sensors 14, the multiple sensors 14 may provide any number of different sensor outputs.

Each of the multiple sensors 14 have been illustrated as being operably coupled to aircraft 20 through a tether 50. The tether 50 may contain power and communication lines such that the tether 50 may provide a link for communication between the aircraft 20 and the multiple sensors 14. In this manner, the sensor output may be relayed to the aircraft 20 through the tether 50. Further, the position of each of the multiple sensors 14 may be controlled through the tether 50.

More specifically, in the illustrated example, a drogue 52 is coupled to the tether 50 and one of the multiple sensors 14 is operably coupled to the drogue 52. It is contemplated that multiple drogues 52 may be coupled to a single tether 50 and multiple sensors 14 may be coupled to a single drogue 52 in order to increase the number of multiple sensors 14 as well as the area over which the multiple sensors 14 are collecting data. With the inclusion of the drogue 52 in the sensor system 10 it is contemplated that, the drogue 52 may be stored on the aircraft 20 attached to a pod or in the frame of the aircraft 20. When the drogue 52 is deployed, the drogue 52 may maintain connection to the vehicle through the tether 50. Further, the tether 50 may be used for deployment and retraction as well as controlling the distance the drogue 52 is from the aircraft 20. The drogue 52 may also use the relative navigation grid 24 for station keeping of the drogue 52. The drogue 52 may also have various orientation sensors to determine positioning of the at least one of the multiple sensors 14 for data correlation and processing.

While the multiple sensors 14 have been illustrated as being operably coupled to the aircraft 20 this need not be the case and the multiple sensors 14 may be located within the relative navigation grid 24 without being coupled to the aircraft 20. This may be done in any number of suitable ways including that one or more of the multiple sensors 14 may be operably coupled to any number and type of other aircraft. In such an instance, it will be understood that the multiple sensors 14 need not be tethered to the other aircraft and may be operably coupled to such other aircraft in any suitable manner. In this regard, it will also be understood that embodiments of the invention may be used with any type of aircraft, for example, without limitation, fixed-wing, rotating-wing, rocket, personal aircraft, military aircraft, air balloon, and unmanned aerial vehicles. Furthermore, each of the multiple sensors 14 need not be operably coupled to the same aircraft or the same type of aircraft. By way of non-limiting example, one of the multiple sensors 14 may be mounted to an unmanned aerial vehicle while another of the multiple sensors 14 may be operably coupled to the aircraft 20.

Regardless of whether the multiple sensors 14 are operably coupled to the aircraft 20 and/or are operably coupled to alternative aircraft, it may be understood that the multiple sensors 14 may be remote from the aircraft 20. It is also contemplated that one or more of the multiple sensors 14, such as the sensor 54, may be mounted to the aircraft 20 and may not be remote from the aircraft 20. The sensor 54 may be located such that it is still located within the field of transmission 22 of the grid generator 12. Further, regardless of whether the multiple sensors 14 are tethered to the aircraft 20 or are operably coupled to alternative aircraft, it may be understood that the multiple sensors 14 may be positionable relative to the aircraft 20. The multiple sensors 14 may be positioned in any suitable way; by way of non-limiting examples, station keeping technologies such as steering vanes and steering thrusters may be used.

The relative navigation grid 24 generated by the grid generator 12 may be detected and read by a position detector 16. More specifically, the position detector 16 may be configured to detect the position of each of the multiple sensors 14 relative to the relative navigation grid 24 and may provide corresponding position outputs. The position detector 16 may include a position sensor for each of the multiple sensors 14, with each position sensor outputting a position signal indicative of the position of each of the multiple sensors 14 within the relative navigation grid 24.

In the illustrated example, the position detector 16 is also located on the aircraft 20 although this need not be the case. The grid generator 12 and position detector 16 may be mounted to at least one of the aircraft 20, the multiple sensors 14, or additional aircraft on which the multiple sensors 14 or just the grid generator 12 or position detector 16 may be mounted. For example, the grid generator 12 may be mounted to the aircraft 20 or the multiple sensors 14 and the position detector 16 may be mounted to the other of the aircraft 20 or the multiple sensors 14. It will be understood that the sensor system 10 may take a variety of alternative forms including that the grid generator 12, multiple sensors 14, and position detector 16 may all be located on separate aircraft or may all be operably coupled to a single aircraft such as the aircraft 20. In the case where the position detector 16 is included on a separate aircraft it will be understood that the position detector 16 may be within the field of transmission 22 of the grid generator 12, enabling the position detector 16 to "see" the relative navigation grid 24.

A controller 56 may also be included in the aircraft 20. It is contemplated that the coordination engine 18 may be included in the controller 56. The controller 56 may include memory, the memory may include random access memory (RAM), read-only memory (ROM), flash memory, or one or more different types of portable electronic memory, such as discs, DVDs, CD-ROMs, etc., or any suitable combination of these types of memory. A set of executable instructions may be provided in the memory for determining the position of the multiple sensors 14 based on the position outputs from the position detector 16. The controller 56 may also include a processor, which may be running any suitable programs and may be operably coupled to the coordination engine 18.

During operation, a relative navigation grid may be projected by the grid generator 12 within the field of transmission 22. The multiple sensors 14 may be located therein and may output sensor outputs. A spatial position of the multiple sensors 14 may be determined by the position detector 16 based on their position within the relative navigation grid 24. The position detector may output position outputs based thereon and the coordination engine 18 may coordinate the sensor outputs from the multiple sensors 14 based on the position output from the position detector 16 and may generate a coordinated sensor output based thereon. The controller 56 or other processor may extract dimensional artifacts and allow for true wide field stereolithography based on the coordinated sensor output.

It will be understood that during operation, the grid generator 12 may form repeated relative navigation grid projections and a complete relative navigation grid may be projected multiple times a second, the relative navigation grid, as detected by the position detector 16 may appear to jump around or jitter. In reality, while the relative navigation grid may appear jumpy, it typically will not have substantively moved. The relative navigation grid may be stabilized to account for such movement of the grid generator 12 and provide a relative navigation grid that appears relatively stable. Such stabilization has been described in the disclosure Ser. No. 13/286,710, filed Nov. 1, 2011, and entitled Relative Navigation System, which is incorporated by reference.

Figure 3:
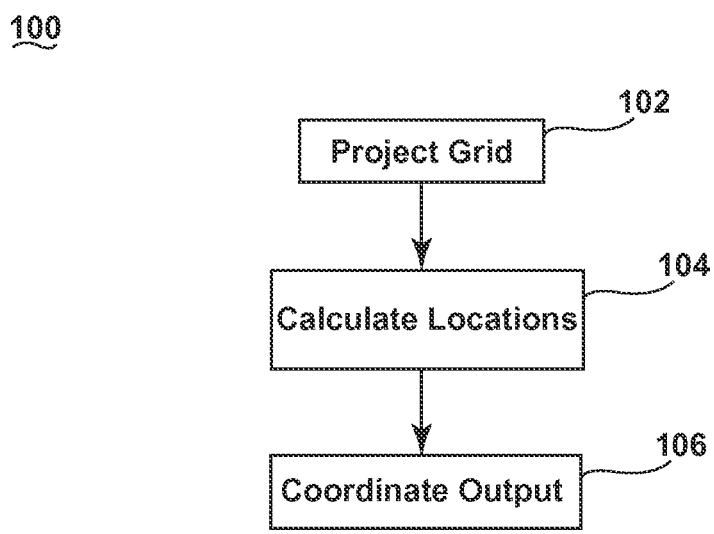
FIG. 3 is a flow chart of an embodiment of a method for utilizing multiple airborne sensors according to an embodiment of the invention.

FIG. 3 illustrates a method 100 of utilizing multiple airborne sensors such as the multiple sensors 14 in the sensor system 10. Such a method may be used with any of the above described embodiments including the illustrated embodiment and a variety of its alternatives. The method 100 begins at 102 with projecting a relative navigation grid. Such a relative navigation grid may be projected from a grid generator as described above. The grid generator may be located on one of an aircraft or on one of the multiple airborne sensors. Projecting the relative navigation grid may include projecting in a direction where at least one of the multiple airborne sensors should be. The direction may be at least one of forward, rearward, upwards, downwards, to one side, or a combination of several directions from the position of the grid generator.

At 104, a spatial position of the multiple sensors within the relative navigation grid may be determined. Determining a spatial position of the multiple sensors within the relative navigation grid may include receiving a position signal indicative of the position of the multiple sensors within the relative navigation grid from a position detector. A controller may execute a set of executable instructions for determining the position of the multiple sensors based on the position signal. At 106, the sensor outputs from the airborne sensors may be coordinated based on the determined spatial position of the multiple sensors. Such coordination may use the precise position of the multiple sensors in the grid reference system to provide coordination data necessary to extract dimensional artifacts and allow for true wide field stereolithography.

It should be noted that the sequence depicted is for illustrative purposes only and is not meant to limit the method 100 in any way. It may be understood that the portions of the method may proceed in a different logical order, additional or intervening portions may be included, or described portions of the method may be divided into multiple portions, or described portions of the method may be omitted without detracting from the described method. For example, it is contemplated that the controller may also determine if the position of at least one of the multiple sensors conforms to a predetermined position. If the position does not conform to the predetermined position the position of at least one of the multiple sensors may be altered based on the determined spatial position of the multiple sensors. Altering the position of at least one of the multiple sensors may include using steering thrusters operably coupled to the at least one of the multiple sensors. It will be understood that such determining and altering may be repeated to maintain the multiple sensors in such predetermined positions during flight. The method becomes more complex when more than one aircraft is used and when those aircraft are equipped with any number and combination of grid projectors, position detectors, and sensors. Further, the method may become more complex as reflectors may be used such that signals or portions of the grid may be received through reflectance or directly.

The above described embodiments provide for a number of benefits including a greater separation between sensors than is currently available due to limitations in vehicle size. This allows for less passes of the aircraft over an area to be imaged as the above described embodiments may image larger areas than currently necessary. The above described embodiments may exponentially increase the virtual size of the platform's sensor array. Further, the above described embodiments provide for the ability to have active stabilization and precise location of the multiple sensors in a grid reference system, which provides coordination data necessary to extract dimensional artifacts and allow for true wide field stereolithography, 3D model extrusion, signal triangulation, and active signal source separation. Further still, in embodiments including drogues the drogues may be steered not only in x, y, and z planes but also in roll, pitch, and yaw, which allows for the drogue to perform gimbal-like operations without incurring the expense of gimbal mechanicals and electronics. The grid reference system further provides for identifying the attitude/orientation of the sensor relative to the grid, other sensors and to the aircraft, which provides for knowing the relative location and attitude between any of the aircraft and sensors. This allows for simple retrofit of sensors onto platforms that do not currently include gimbal payloads or have prohibitive costs for retrofitting existing gimbal systems with new sensors. When using sensors that require active emission of characteristic signatures, placement of the sensor in a drogue allows for separation of the signal source from the rest of the vehicle and may reduce the operational risk when deployed in theatre. For purposes of this description, determining the relative position of an item to the grid is intended to be generic and can include determining just the location, just the attitude or both, unless otherwise expressly limited.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor system having multiple sensors coupled to at least one aircraft, wherein each of the sensors is operably coupled to the at least one aircraft through a tether, each sensor coupled proximate to one end of each tether and the other end of each tether being attached to the aircraft, the sensor system, comprising:

a grid generator projecting into a space behind the aircraft a relative navigation grid;
multiple sensors located within the relative navigation grid and providing sensor outputs;
a position detector configured to detect the position of each of the multiple sensors relative to the relative navigation grid and providing corresponding position outputs; and
a coordination engine configured to coordinate the multiple sensor outputs based on the corresponding position outputs provided by the position detector and generate a single coordinated sensor output, wherein the coordination engine uses the precise position of the multiple sensors in the navigation grid to provide coordination data necessary to combine the data into the single coordinated sensor output such that dimensional artifacts can be extracted from the single coordinated sensor output and true wide field stereolithography allowed.

2. The system of claim 1 wherein the position detector comprises a position sensor for each of the multiple sensors, with each position sensor outputting a position signal indicative of the position of the sensor within the relative navigation grid.

3. The system of claim 1, further comprising a controller having a memory and a set of executable instructions, provided in the memory for determining the position of the multiple sensors based on the position outputs.

4. The system of claim 1 wherein the multiple sensors are at least one of an EO/IR, SWIR, MWIR, Multispectral, Hyperspectral, SAR, SIGINT, SONAR, and Radio type.

5. The system of claim 1 wherein the grid generator and the position detector are mounted to the at least one aircraft.

6. The system of claim 1 wherein the multiple sensors are positionable relative to the at least one aircraft.

7. The system of claim 1, further comprising at least one drogue coupled to the tether and at least one of the multiple sensors is operably coupled to the drogue.

8. The system of claim 1 wherein the multiple sensors are remote from the at least one aircraft.

9. A method of utilizing multiple airborne sensors operably coupled to at least one aircraft and providing a sensor output, wherein each of the sensors is operably coupled to the at least one aircraft through a tether, each sensor coupled proximate to one end of each tether and the other end of each tether being attached to the aircraft, the method comprising:

projecting a relative navigation grid from the at least one aircraft into a space behind the aircraft;
determining a spatial position of the multiple sensors within the relative navigation grid; and
coordinating the sensor outputs from the multiple airborne sensors into a single output based on the determined spatial position of the multiple sensors within the relative navigation grid, wherein the coordinating is based on the precise position of the multiple airborne sensors within the relative navigation grid to provide location data necessary to combine the outputs such that extract dimensional artifacts can be extracted from the single output and true wide field stereolithography allowed.

10. The method of claim 9, further comprising altering a position of at least one of the multiple sensors based on the determined spatial position of the multiple sensors.

11. The method of claim 10 wherein altering the position of at least one of the multiple sensors comprises using a steering force acting on the at least one of the multiple sensors.

12. The method of claim 9 wherein the determining a spatial position of the multiple sensors within the relative navigation grid comprises receiving a position signal indicative of the position of the sensor within the relative navigation grid from a position detector.

13. The method of claim 12 wherein the determining a spatial position of the multiple sensors within the relative navigation grid comprises a controller executing a set of executable instructions for determining the position of the multiple sensors based on the position signal.

* * * * *

UNITED STATES PATENT AND TRADEMARK OFFICE
CERTIFICATE OF CORRECTION

PATENT NO. : 9,322,651 B2
APPLICATION NO. : 13/598115
DATED : April 26, 2016
INVENTOR(S) : Buehler et al.

Page 1 of 1

It is certified that error appears in the above-identified patent and that said Letters Patent is hereby corrected as shown below:

In the claims,

In Column 8, Line 57, in Claim 9, delete "that extract" and insert -- that --, therefor.

Signed and Sealed this
Ninth Day of August, 2016

Michelle K. Lee
*Director of the United States Patent and Trademark Office*